Sept. 1, 1959  A. B. LERNER  2,902,349
LABORATORY EQUIPMENT ELEVATION ADJUSTING APPARATUS
Filed July 11, 1955  2 Sheets-Sheet 1
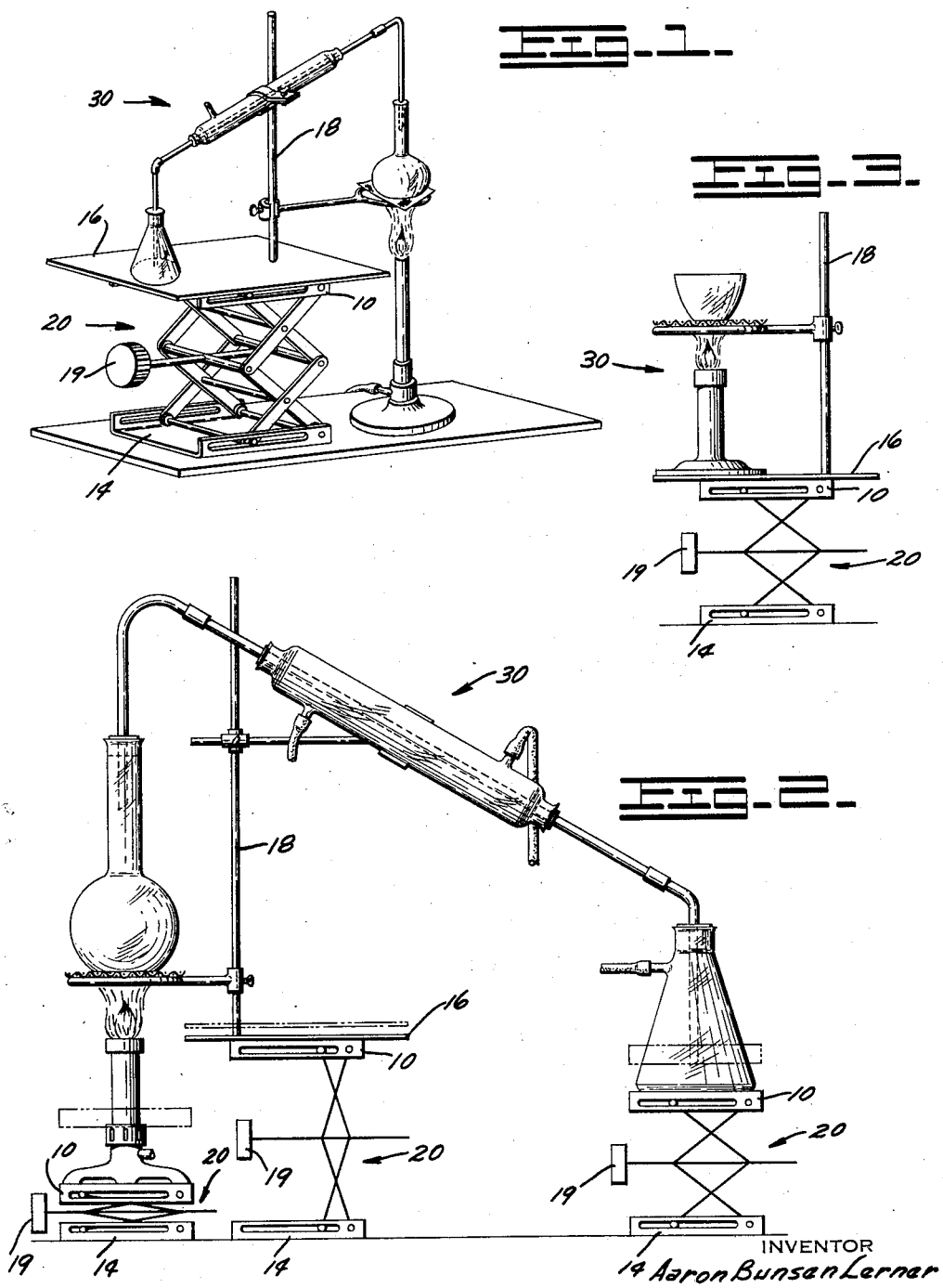
INVENTOR
Aaron Bunsen Lerner
BY Winston E. Miller
ATTORNEY Sept. 1, 1959 A. B. LERNER 2,902,349
LABORATORY EQUIPMENT ELEVATION ADJUSTING APPARATUS
Filed July 11, 1955 2 Sheets-Sheet 2
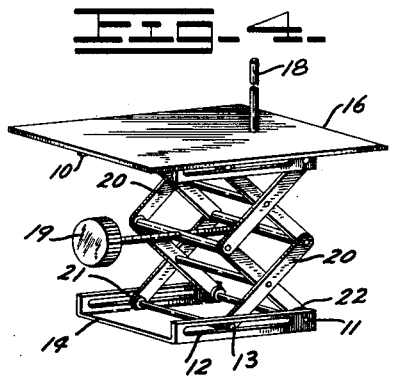
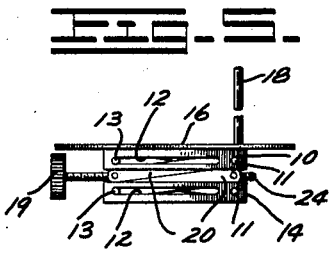
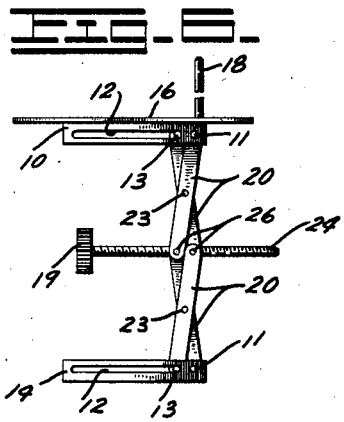
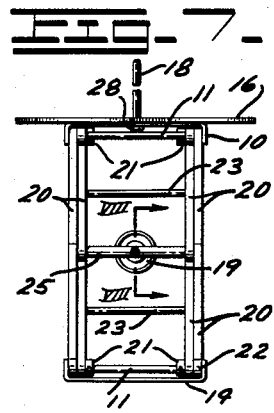
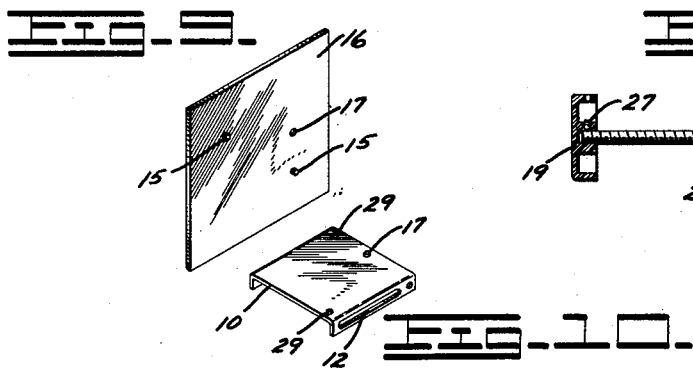
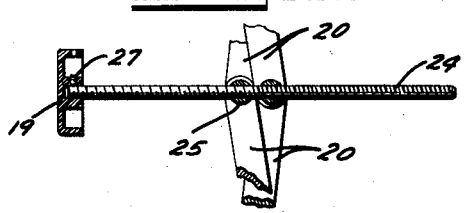
INVENTOR
Aaron Bunsen Lerner
BY Winston E. Miller
ATTORNEY United States Patent Office 2,902,349
Patented Sept. 1, 1959

2,902,349

LABORATORY EQUIPMENT ELEVATION ADJUSTING APPARATUS

Aaron Bunsen Lerner, Portland, Oreg.

Application July 11, 1955, Serial No. 521,072

1 Claim. (Cl. 23—259)

The present invention relates to an elevation adjusting apparatus for laboratory equipment and more particularly is directed to mechanism making possible accurate vertical elevation and depression of laboratory equipment thus substantially eliminating interruption for alignment and realignment in the assembly of laboratory structure and the handling of hot and oftentimes corrosive material.

Emphasis upon laboratory work in both the chemical and physical scientific fields has resulted in enormous technological gains, yet the techniques and basic tools available to the laboratory technician, chemist, or physicist have been subject to very little change. The ring stands of a century ago, necessitating manual locking and unlocking of ring for vertical column adjustment have undergone little or no change. Requirement for elevational change during experimentation when using the old ring stand is usually met by delay in making the adjustment and frequently results in burned, scorched, or seared fingers for the technicians who make the necessary alterations. Laboratory set-ups have become more complex and more accuracy in elevation adjustments of equipment is required. A minimization of the time required for completion of such changes is desirable. Not infrequently these elevation adjustments of laboratory equipment have been made by piling notebooks or textbooks and similar blocks or shims beneath the equipment components. With set-ups made in this manner operational adjustments have become burdensome and time consuming. It will thus be appreciated that where fractional distillation, for example, is reproduced on a laboratory scale the contribution of the presently described structure saves countless set-up hours by making available artificially elevated and depressed datum planes.

It is therefore among the principal objects of the present invention to provide a structure which has extreme versatility in scientific laboratories where equipment components require vertical adjustment and to provide a method for making such adjustments.

Another of the objects of the present invention is to provide a light-weight portable laboratory equipment elevation adjusting apparatus of sufficient structural durability to withstand a variety of laboratory uses while preserving the operating mechanism from direct deteriorating influences.

Another object of the present invention is to provide a laboratory equipment elevation adjusting apparatus which may be remotely operated with respect to the equipment it is supporting.

It is a further object of this invention to provide an equipment elevation adjusting apparatus that is compact in its depressed position but when it is opened will extend in a range of greater than three times its depressed height.

It is a further object of this invention to provide a device for adjusting the height of laboratory equipment and to which may be attached directly certain auxiliary laboratory equipment, for example beakers, stills, burettes, heat sources, and the like.

A still further object of the present invention is to provide a laboratory elevation adjusting apparatus which has complete interchangeability of parts and being inexpensive to make and easy to manufacture, assemble and repair.

It is a further object of this invention to conveniently accommodate vertical adjustments of laboratory components without horizontal or lateral displacement.

These and other objects of the present invention will become apparent to those skilled in the art as the description proceeds and reference is had to the accompanying drawings, in which:

Figure 1 is a perspective view of a conventional distillation apparatus positioned on an elevating structure in accord with the present invention and having a condensate flask on the stage with associated tubing and a condenser secured to the vertical column with a ring extending from the post positioning a distillation flask over the flame of a modified Bunsen burner. Adjustment of the stage moves the entire set-up into and out of contact with the flame or heat source.

Figure 2 is a side elevation schematic view of a plural usage of elevation adjusting apparatus in accord with the present invention showing one unit in use without stage and post for adjusting the elevation of a heat source, another unit is shown with cooperating stage ring and post supporting laboratory components, and the third elevation unit is shown supporting a flask, and each of the elevating units is adjusted to satisfactory elevations from a common plane.

Figure 3 is a side elevation schematic view of an elevation adjusting apparatus in accord with the present invention and illustrates the use of ring post and stage to simultaneously support laboratory equipment in fixed elevational adjustment so that the datum planes of both equipment components are adjusted simultaneously upon activation of the illustrated structure.

Figure 4 is a perspective view illustrating an equipment elevating apparatus constructed according to the present invention.

Figure 5 is a side elevation view illustrating the compactness of the elevating apparatus in the fully depressed position.

Figure 6 is a side elevation view illustrating the mechanism of the elevating apparatus in the fully extended position in use with the stage.

Figure 7 is a rear view of the elevating apparatus showing the rigid construction of the apparatus in a partially extended position.

Figure 8 is a cross-section view taken along the line VIII—VIII in Figure 7 and illustrates the engagement of the actuating screw with the draw bars and shows the adjusting knob in position on the actuating screw.

Figure 9 is a perspective drawing of the stage of the elevating apparatus showing the locating of the mounting pins and the accommodating registering hole for the post.

Figure 10 is a perspective drawing of the top platform indicating the pin locating holes for the attachment of the stage and the location of the hole registering with the accommodating hole in the stage for the attachment of the post.

Figure 11 is a perspective drawing of the bottom frame indicating the hole arrangement so that the elevating apparatus may be inverted using the bottom platform as the top platform and still permit the mounting of the detachable stage and ring stand.

*General description*

In general, and with reference to Figures 1, 2 and 3 it will be seen that the contribution here encompasses an elevation changing apparatus having integrated therewith a cooperating stage and post mounted on a height adjusting pedestal so as to accomplish vertical movement in associated laboratory equipment while avoiding the necessity of physical operator contact with the associated equipment.

*Specific description*

Referring more specifically to the drawings, the numeral 10 designates the top platform constructed of metal or other suitable durable material which is bent or formed to comprise a shallow channel. One end of each of the downturned legs of the channel comprising the top platform 10 is drilled to accommodate the positioning of the rear fixed axle 11. In the other ends of each of the downturned legs, and extending substantially to the drilled holes for mounting the fixed rear axle 11, are tracks or slotted guides 12 in which move the slidably mounted axles 13. The top platform is best shown in Figure 10, shorn of attachments.

The bottom platform 14 is a duplicate of the top platform 10, and is constructed in the same manner as hereinabove set forth. The dissimilarity between the top platform 10 and the bottom platform 14 is in the drilled holes in the webbed portions of the channel-like platforms 10 and 14. Figures 10 and 11 best demonstrate the location of the two diagonally located holes for the accommodation of the locating pins 15 which are attached to the bottom of the stage 16. Registering hole 17 in the stage 16 is repeated in the web of both top platform 10 and bottom platform 14 to accommodate the mounting of the detachable post 18. The post 18 when attached to the stage 16 and platform 10 results in an elevationally adjustable ring stand as best shown in Figures 1, 2 and 3 with associated apparatus. The similarity of the top platform 10 and the bottom platform 14 when used in conjunction with the stage 16 permits the elevating apparatus to be inverted so as to vary the location of the post 18 from the end nearest the adjusting knob 19 to the end opposite the adjusting knob 19 in assembly.

Linking the top platform 10 with the bottom platform 14 are two sets of toggle arms or lazy tongs 20. One end of each set of toggle arms is pivotally attached to the top platform 10 and bottom platform 14 by means of rear fixed axles 11. The rear fixed axles 11 are secured from lateral movement by collars 21 attached to the fixed rear axles 11 by set screws or other means well known in the art. The collars 21 are the most suitable embodiment since they are of sufficient dimensions to stabilize the pivotally attached ends of the toggle arms or lazy tongs 20.

The other ends of each set of toggle arms or lazy tongs 20 are slidably attached in the tracks or slotted guides 12 of the top platform 10 and the bottom platform 14 by sliding axles 13 and any lateral movement of the sliding axles 13 is prevented by collars 21 fixed to the sliding axles 13 by set screws or other means well known in the art. Collars 21 are the most suitable embodiment since they are of sufficient dimension to stablize the structure at the slidably attached ends of the sets of toggle arms or lazy tongs 20. Spacers 22 of the same diameter as the collars 21 and of the same thickness as the stock comprising the toggle arms or lazy tongs 20 are made to fill in the gap between the top platform 10 and the ends of the slidably connected toggle arms or toggle straps 20. The same use of the spacers 22 is applicable in separating the bottom platform 14 from the toggle arms 20 where they are pivotally connected.

Where the toggle arms or toggle straps 20 cross, center pivot posts 23 permit free revolution of the toggle arms or toggle straps 20 in planes perpendicular to the center pivot posts 23. The pivot posts 23 function to give greater stability to the elevating apparatus when it is in an extended position and separate securely the two sets of toggle arms or toggle straps 20 which sets of toggle arms or lazy tongs 20 are concurrently operating when the device is actuated.

The tracks or slotted guides 12 permit the slidably attached ends of the toggle arms or toggle straps 20 to move horizontally when the device is actuated.

An actuating screw 24 is provided which is threaded oppositely at either end with the run-out of the threads at the approximate center of the device when the elevating apparatus is in the depressed position as shown in Figure 5. The actuating screw 24 is of such dimension as to minimize any tendency to distort the top frame 10 from the horizontal plane. One thread dimension ⅜"–16 (by way of illustration only) has been found very satisfactory. Finer threads have been found to give finer adjustment but tend to make the structure harder to operate under load. The indicated thread series is a compromise between accuracy of adjustment and ease of operation. Draw bars 25 act as separators, as do the center pivot posts 23 maintaining rigidity in the device and acting as pivotal connections for the toggle arms or toggle straps 20. The draw bars 25 are retained by means well known to the art and as preferably embodied in the drawings by snap-rings or draw bar retainers 26. The draw bars 25 are pierced and threaded at the center at right angles to their longitudinal axes. The draw bars 25 are threaded oppositely so as to engage the correspondingly threaded ends of the actuating screw 24. An adjusting knob 19 is rigidly connected to the screw 24 by means of set screw 27 or other convenient and well known means. The two sets of toggle arms 20 and the actuating screw 24 comprise, upon connection with the draw bars 25, the toggle system which accomplishes controlled elevation and depression of the laboratory elevation adjusting apparatus.

A detachable cooperating stage 16 is provided, herein shown as square or rectangular, but which may be of a convenient size and shape to accommodate special conditions and which is detachably fixed to either the top platform 10 or the bottom platform 14 by means of locating pins 15, which pins engage holes 29 similarly located in both the top platform 10 and the bottom platform 14 (best shown in Figures 9, 10 and 11).

A hole 17 in the stage 16 registers with the holes 17 in the top platform 10 or the bottom platform 14. This arrangement permits the elevating apparatus to be inverted so as to reverse the relative location of the detachable post 18.

The vertical post 18 is attached and detached by means of a nut or post fastener 28 but which means of fastening may be accomplished by other convenient fasteners known to the art.

All of the parts of the laboratory equipment elevating device as shown in the Figure 5 are preferably constructed of durable metal or other material, or coated in such a way as to render the parts thereof corrosion resistant. The materials comprising parts of the elevating apparatus may be varied so as to meet the specific type of destructive and corrosive environment encountered under varying laboratory conditions. Examples of variations, not intended to exhaust the range, are stainless steel, plastics, aluminum, cadmium coated aluminum, bronzes, asbestos and laminated fibrous materials. Combinations of all of these materials and others may be used in a desirable application of this invention.

The adjusting knob 19 is preferably made from some heat resistant composition selected for its insulating qualities, and when so constructed permits the structure to become quite hot without the adjusting knob 19 becoming unpleasantly warm.

The activating linkage has been described as a lazy tongs. The lazy tongs linkage is the preferred embodiment because it is operative within the ordinary laboratory limits of elevation and depression and is inexpensive to manufacture and assemble. It will be appreciated that remote control of the disclosed structure has particular utility in laboratory and pilot plant set-ups in experimentation with fissionable material for example. The set-ups can be elevated to any relative datum plane without human handling of contaminated equipment by extending the actuating knob and screw and associating therewith controlled actuation by Selsyn elements well known in the art, for example.

It will be further seen that the complete interchangeability of parts, top and bottom platforms 10 and 14, straps comprising the elevating lazy tong system 20, collars 21, and spacers 22, make the structure herein described readily amenable to mass production and universal availability at low cost.

Operation

In operation, the laboratory equipment elevating apparatus can be depressed or elevated by turning the adjusting knob 19 which causes the draw bars 25 to move either toward the center of the actuating screw 24 or away from the center of the actuating screw 24. If the draw bars 25 move toward the center of the screw 24 they bring with them the slidably mounted pairs of toggle arms or lazy tongs 20 which arms rotate from an almost horizontal position when the device is depressed (Figure 5) to an almost perpendicular position when the device is fully elevated (Figure 6).

If the screw 24 is turned by the adjusting knob 19 so as to force the draw bars 25 away from each other, an opposite effect results. The slidably mounted ends of the toggle arms or lazy tongs 20 are permitted movement along the tracks or slotted guides 12 while the toggle arms or toggle straps 20 revolve where they cross and the pivotally attached ends of each set of toggle arms 20 remain in a constant position. This gradually collapses the elevating apparatus in an area defined by its bottom platform 14. At all heights within the lowering or elevating limits of the elevating apparatus, the top and bottom platforms 10 and 14 are parallel and the top platform 10 is directly above the bottom platform 14. The stage 16 provides an expansion of working area for either the top or bottom of the elevating apparatus depending upon the desired positioning of the post 18, which positioning may be reversed (Figures 1, 2, 3 and 9, 10, 11) by merely inverting the elevating apparatus. Stage locating pins 15 engage the platforms 10 and 14 in the stage locating pin holes 29 so that the stage 16 is secured against any horizontal rotation or movement. The stage or platform 16 is of such dimensions that when it is in place it substantially shrouds all working parts of the elevating apparatus actuating means. The post 18 is attached by inserting the threaded portion of the post 18 through the registering post holes 17. By the inversion of the elevating apparatus and by repositioning the stage 16, the post 18 may be mounted on either the end of the apparatus nearest the adjusting knob 19 or at the opposite end of the device. When thus assembled the elevation adjusting structure provides a ring stand to which laboratory apparatus or components 30 may be attached for vertical adjustment requiring no manipulation of ring stand clamps.

Where it is desirable to broaden the base of the elevating apparatus, stage 16 may be used as a base extension without ring stand. When the device is fully depressed, the apparatus is exceedingly compact. When the apparatus is fully expanded, the height of the stage 16 is greater than three times the depressed height of the structure. Laboratory equipment 30 (Figures 1, 2 and 3) is placed on the uppermost platform 10, stage 16, or post 18 comprising the adjustable ring stand, and upon simple turning of the actuating knob 19 elevational adjustment of selected laboratory components 30 are speedily accomplished.

In the laboratory, it is desirable and in many cases essential that apparatus be adjusted without disturbing horizontal or lateral alignment. A rapid, efficient, and satisfactory device for achieving this desirable result has been provided by this invention. The Figures 1, 2 and 3 schematically illustrate various combinations of the elevation adjusting structure in association with various pieces of laboratory equipment 30 and show the method of use including: the placing of laboratory apparatus 30 on the stage 16; the elevating of the stage 16, and the selection of various datum planes thereby for selective elevational positioning. The elevating apparatus is compact and, in conjunction with its detachable stage shrouding the working parts and its ring stand, provides a useful and novel instrument capable of performing numerous laboratory tasks with attendant diminution of time involved in making height adjustments in laboratory set-ups. Prior ring stands have failed to provide the necessary answer to the problem of handling cumbersome laboratory apparatus. The laboratory equipment elevation adjusting apparatus, herein described, answers the laboratory's demand for a durable, stable, and structurally dependable means for handling most laboratory materials where accurately aligned vertical adjustments are required.

This application is a continuation-in-part of copending application, Serial Number 320,421, filed on November 14, 1952, now abandoned.

Having thus described the invention and method for its use, it is to be understood that the same is susceptible to certain changes comprehended by the spirit of the invention as herein described limited only by the scope of the claim.

I claim:

A laboratory equipment support capable of adjustment to different vertical heights and comprising a base, an elevatable platform and a lazy tong device interposed between said base and platform, said lazy tong device comprising pivoted link units connected to opposite portions of said base and platform, respectively, with each unit consisting of two pairs of cross-connected links, the links of each pair having an articulated joint therebetween formed by a draw bar extending to and between the corresponding joint of the opposite link unit, said base and platform each including a horizontal web portion having opposed upwardly and downwardly directed flanges, respectively, each of which flanges includes means for anchoring an extremity of one of the link pairs and a horizontal guide track for guiding the corresponding extremity of the other associated link pair, an actuator for the lazy tong device comprising a rod passing through the midpoint of said articulated joint draw bars and having oppositely threaded screw connections therewith with an actuating knob on one end of the actuator, said lazy tong device being capable of being completely collapsed, with the platform being separated from the base by not more than approximately the vertical width of one of said links, whereby the support may be stored in minimum space, a flat stage removably attachable to said platform, and means for detachably securing a stand to said platform.

References Cited in the file of this patent

UNITED STATES PATENTS

| | | |
|---|---|---|
| 755,706 | Schellenbach | Mar. 29, 1904 |
| 1,088,419 | Heyer | Feb. 24, 1914 |
| 2,156,148 | Di Giacomo et al. | Apr. 25, 1939 |
| 2,222,464 | Newman | July 27, 1939 |
| 2,531,880 | Herring | Nov. 28, 1950 |

FOREIGN PATENTS

| | | |
|---|---|---|
| 67,517 | Denmark | Aug. 30, 1948 |

OTHER REFERENCES

Modern Laboratory Appliances, by Fisher and Eimer, and Amend. Cat. No. 90, 1942, page 850, Fig. 14–673.

Williams. Handbook of Chemical Manipulations, pp. 156–158, 161, 1857.